United States Patent
Ishizuka

(10) Patent No.: US 9,040,900 B2
(45) Date of Patent: May 26, 2015

(54) TWO-DIMENSIONAL ABSOLUTE ENCODER AND SCALE THEREFOR

(75) Inventor: Ko Ishizuka, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 183 days.

(21) Appl. No.: 13/477,848

(22) Filed: May 22, 2012

(65) Prior Publication Data

US 2012/0326016 A1     Dec. 27, 2012

(30) Foreign Application Priority Data

Jun. 24, 2011  (JP) ................................. 2011-141215

(51) Int. Cl.
- *H01J 40/14* (2006.01)
- *G01D 5/347* (2006.01)
- *G01D 5/245* (2006.01)

(52) U.S. Cl.
CPC .......... *G01D 5/2455* (2013.01); *G01D 5/34792* (2013.01)

(58) Field of Classification Search
USPC ......... 250/231.13–231.18; 345/614, 616, 617
See application file for complete search history.

(56) References Cited

U.S. PATENT DOCUMENTS

| | | | |
|---|---|---|---|
| 6,937,349 B2 * | 8/2005 | Jones et al. .................... | 356/617 |
| 7,498,563 B2 * | 3/2009 | Mandro et al. ............ | 250/231.13 |
| 2004/0218181 A1 | 11/2004 | Jones | |
| 2008/0040942 A1 | 2/2008 | Eales | |
| 2008/0067333 A1 | 3/2008 | Holzapfel | |

FOREIGN PATENT DOCUMENTS

| | | |
|---|---|---|
| DE | 10-2004-012377 | 9/2005 |
| JP | 11-248489 | 9/1999 |
| JP | 2004-333498 | 11/2004 |
| JP | 2008-525783 | 7/2008 |
| JP | 2010-139334 | 6/2010 |
| WO | 2006/067481 | 6/2006 |
| WO | 2010/004478 | 1/2010 |
| WO | 2010/086585 | 8/2010 |

OTHER PUBLICATIONS

European Search Report dated May 24, 2013, issued during prosecution of related European application No. 12169937.5.

* cited by examiner

*Primary Examiner* — Tony Ko
(74) *Attorney, Agent, or Firm* — Fitzpatrick, Cella, Harper & Scinto

(57) ABSTRACT

A two-dimensional absolute encoder includes; a scale on which marks are arranged at predetermined pitches along first and second directions; a detector configured to detect a number of marks arranged in each direction; and a processor configured to obtain an absolute position of the scale in the each direction based on outputs from the detector. Each mark has one of characteristic corresponding to information of a quantized code used for indicating a position in the each direction. The processor is configured to generate a code sequence including the number of codes based on detection of the number of marks and information corresponding to the characteristic, and to obtain an absolute position of the scale in the each direction based on the code sequence.

24 Claims, 9 Drawing Sheets

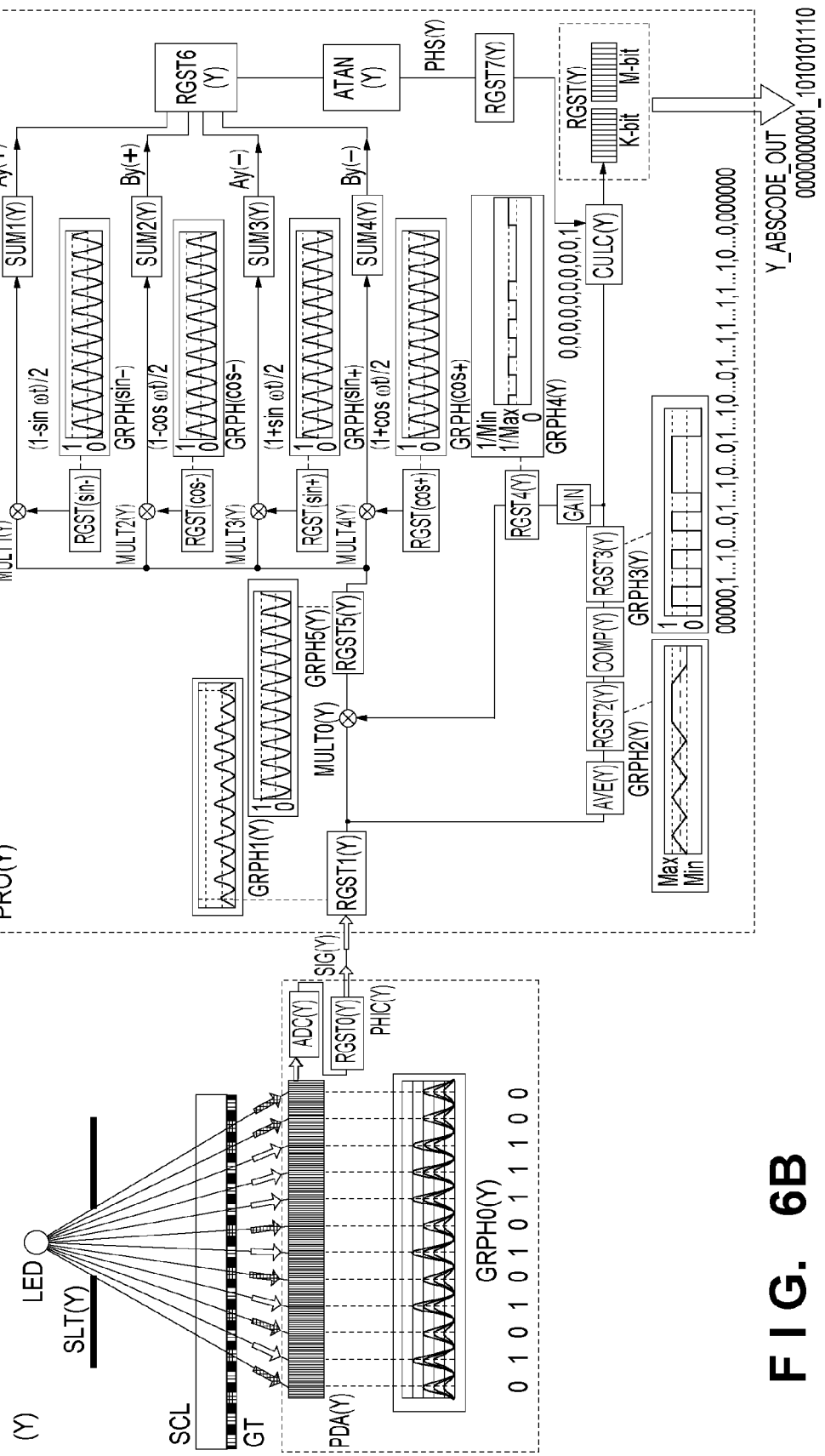
F I G. 6B

TWO-DIMENSIONAL ABSOLUTE ENCODER AND SCALE THEREFOR

BACKGROUND OF THE INVENTION

1. Field of the Invention

The present invention relates to a two-dimensional absolute encoder and a scale therefor.

2. Description of the Related Art

Conventionally, an incremental encoder and absolute encoder are used for the purpose of measuring a stage position of a mechanical apparatus. Applications for incremental encoder towards machine tools and robot fields are limited since absolute position information cannot be obtained unless an origin is first detected. On the other hand, an absolute encoder does not require an origin to be detected since it can obtain absolute position information.

In order to obtain a two-dimensional absolute encoder in X and Y directions, it is common practice to use a method of respectively laying out and detecting two absolute linear encoders on orthogonal side surfaces of a stage. However, a two-dimensional scale is often required to be laid out on one surface such as an upper or lower surface of a stage and to detect that scale by an external detector in individual situations of apparatuses. Some methods of forming a two-dimensional scale pattern having absolute codes have been proposed. Japanese Patent Laid-Open No. 11-248489 discloses a method of embedding patterns used to specify absolute positions at equal intervals in a two-dimensional plane. A two-dimensional absolute encoder described in Japanese Patent Laid-Open No. 11-248489 encodes using black and white patterns by segmenting absolute position information to be embedded at one grid position into a plurality of regions (elements).

Japanese Patent Laid-Open No. 2008-525783 also discloses a method of embedding patterns used to specify absolute positions at equal intervals in a two-dimensional plane. In the method described in Japanese Patent Laid-Open No. 2008-525783, color patterns such as red, blue, and green patterns are laid out around measurement points prepared at equal intervals, and that layout state expresses absolute position information. However, a scale or detecting optical system using color information often requires high cost. A two-dimensional scale described in Japanese Patent Laid-Open No. 2004-333498 divides a two-dimensional plane into square grid regions at equal intervals, thereby giving quasi-random patterns respectively in X and Y directions. With the method described in Japanese Patent Laid-Open No. 2004-333498, specific regions of quasi-random patterns respectively given in the X and Y directions are clipped and simultaneously detected, and a two-dimensional absolute position is specified by combining correlation calculations based on the obtained two-dimensional image pattern. However, the method of designing the two-dimensional pattern described in Japanese Patent Laid-Open No. 2004-333498 is complicated.

In the two-dimensional absolute encoders described in these Japanese Patent Laid-Open No. 11-248489, Japanese Patent Laid-Open No. 2008-525783, and Japanese Patent Laid-Open No. 2004-333498, the resolving power of an imaging (image-taking or image-detecting) optical system is considered as a limit of resolution enhancement (high-resolution enhancement), and resolution enhancement comparable to an incremental encoder cannot be achieved. The two-dimensional absolute encoders described in Japanese Patent Laid-Open No. 11-248489, Japanese Patent Laid-Open No. 2008-525783, and Japanese Patent Laid-Open No. 2004-333498 require high cost since they require a two-dimensional light-receiving element array such as a CCD, marks with a complicated structure, and an image processing technique.

SUMMARY OF THE INVENTION

The present invention provides, for example, a technique advantageous in resolution enhancement of a two-dimensional absolute encoder.

The present invention in its one aspect provides a two-dimensional absolute encoder comprising: a scale on which a plurality of marks are two-dimensionally arranged with a predetermined space therebetween at a predetermined pitch along a first direction and a second direction; a detector configured to detect a first number of marks arranged in the first direction, and to detect a second number of marks arranged in the second direction; and a processor configured to respectively obtain absolute positions of the scale in the first direction and the second direction based on outputs from the detector, wherein each of the plurality of marks has one of characteristics corresponding to pairs of information of a first quantized code for indicating a position of the scale in the first direction, and information of a second quantized code for indicating a position of the scale in the second direction, and the processor is configured to generate a first code sequence including the first number of the first quantized code based on detection of the first number of marks and information of the pairs corresponding to the characteristics, to obtain an absolute position of the scale in the first direction based on the first code sequence, to generate a second code sequence including the second number of the second quantized code based on detection of the second number of marks and the information of the pairs, and to obtain an absolute position of the scale in the second direction based on the second code sequence.

Further features of the present invention will become apparent from the following description of exemplary embodiments with reference to the attached drawings.

BRIEF DESCRIPTION OF THE DRAWINGS

FIG. 6B is an explanatory diagram showing the arrangement of another processor of the two-dimensional absolute encoder according to the second embodiment.

DESCRIPTION OF THE EMBODIMENTS

Embodiments of the present invention will be described in detail hereinafter with reference to the accompanying drawings.

First Embodiment

Figure 1:
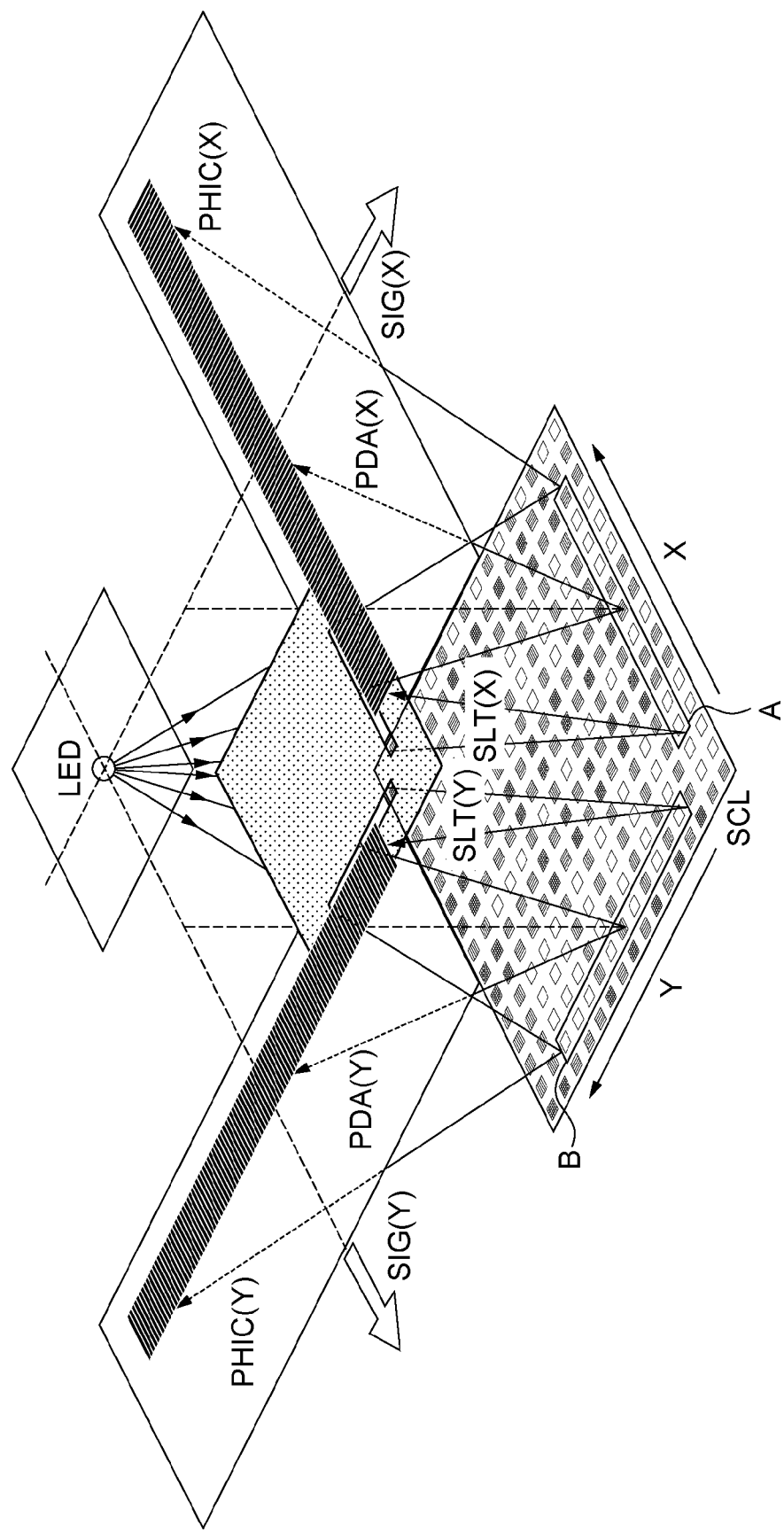
FIG. 1 is a view showing the configuration of an optical system of a two-dimensional absolute encoder according to the first embodiment.
Figure 2A:
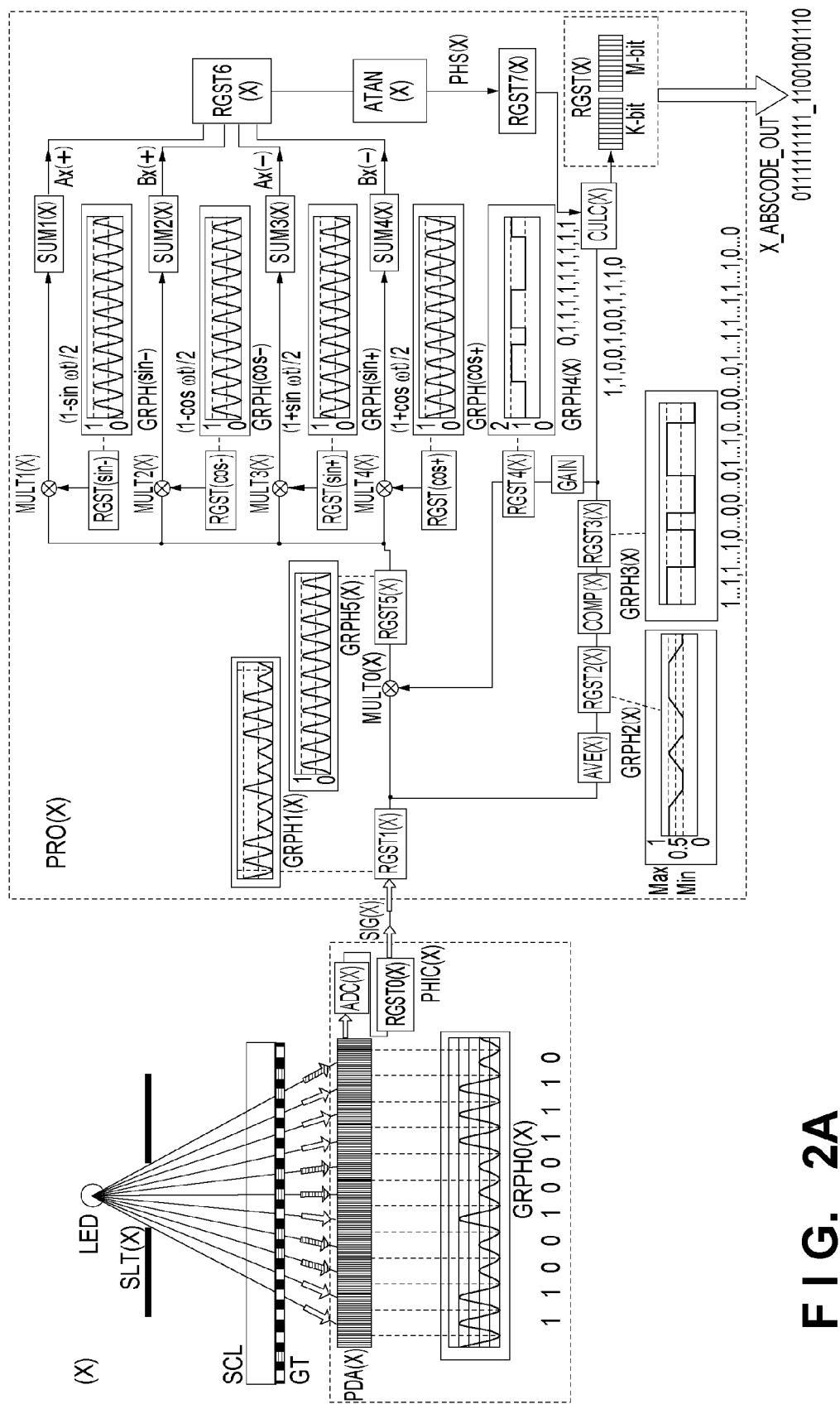
FIG. 2A is a diagram showing the arrangement of a processor of the two-dimensional absolute encoder according to the first embodiment.
Figure 2B:
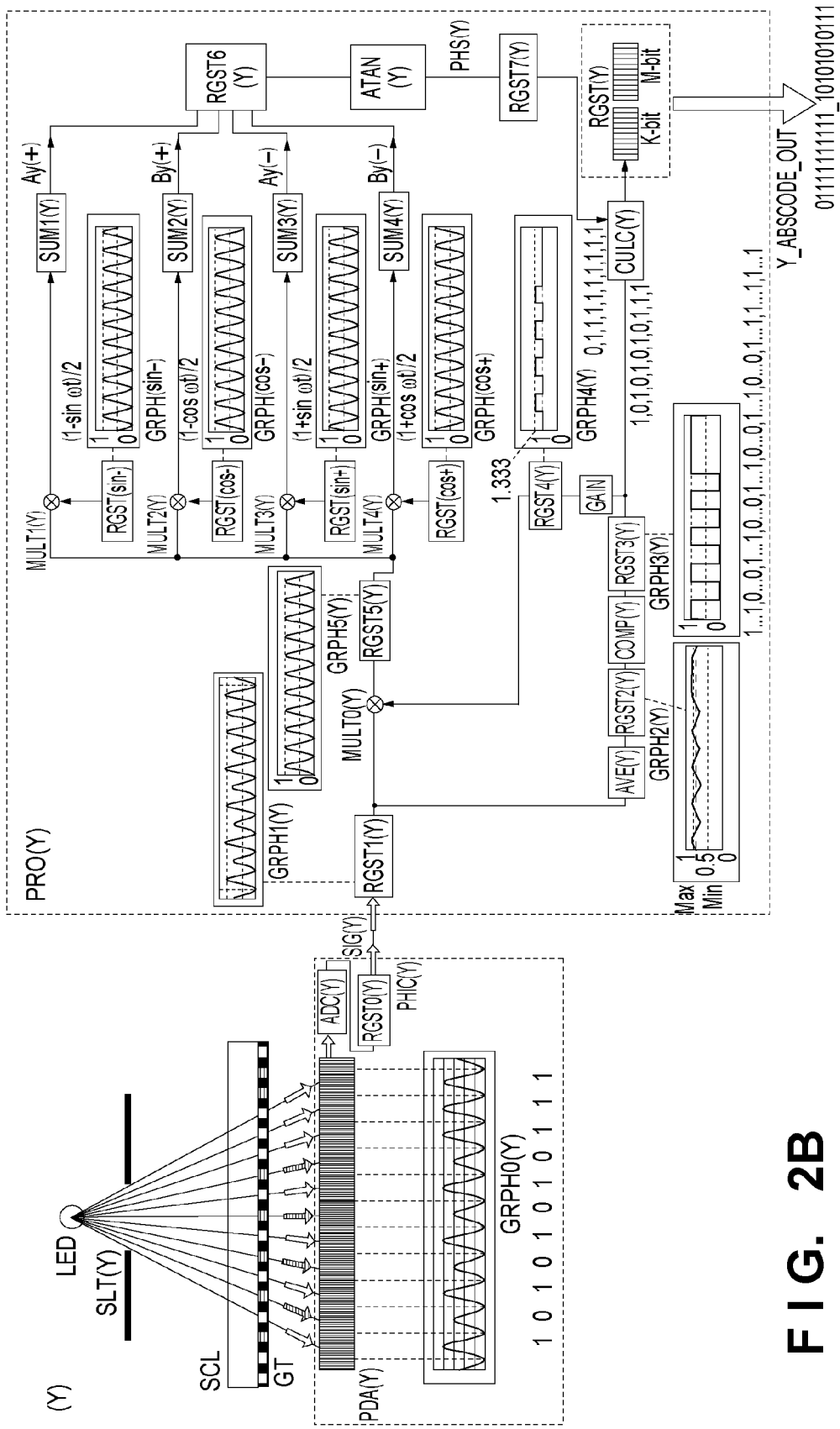
FIG. 2B is a diagram showing the arrangement of another processor of the two-dimensional absolute encoder according to the first embodiment.

FIG. 1 and FIGS. 2A and 2B show a two-dimensional absolute encoder of the first embodiment. For the sake of illustrative convenience, a two-dimensional scale SCL shown in FIGS. 2A and 2B is expressed as a transmission type scale which detects an intensity of light transmitted through the scale. However, the two-dimensional scale SCL of this embodiment is a reflection type scale which detects an intensity of light reflected by the scale. Note that the two-dimensional scale SCL of this embodiment may be a transmission type scale. The two-dimensional absolute encoder illuminates the two-dimensional scale SCL with a light beam selected by an opening SLT(X) of diverging light beams emitted from a light-emitting element LED, and magnifies and projects a light beam reflected by the scale onto a linear light-receiving element array PDA(X). Also, the two-dimensional absolute encoder illuminates the two-dimensional scale SCL with a light beam selected by an opening SLT(Y) of diverging light beams emitted from the light-emitting element LED, and magnifies and projects a light beam reflected by the scale onto a linear light-receiving element array PDA(Y).

As the scale SCL for the two-dimensional absolute encoder, a plurality of square reflecting parts (marks) are two-dimensionally arranged at predetermined pitches along two orthogonal directions (first and second directions) on a non-reflective plate. The reflecting parts include four types, which have the same shape, different reflectances, and correspond to the following four tones. These four tones are formed according to the following rules.
1. Cyclic codes are created in two directions, that is, X and Y directions, and grids are defined on X- and Y-axis coordinates.
2. Reflectances of square reflecting parts for codes on the grid on the Y-axis coordinates are set as follows.

When a code in the X direction (first code) is 0 and that in the Y direction (second code) is 0, a reflectance is 25%.

When a code in the X direction is 1 and that in the Y direction is 0, a reflectance is 50%.

When a code in the X-direction is 0 and that in the Y direction is 1, a reflectance is 75%.

When a code in the X-direction is 1 and that in the Y direction is 1, a reflectance is 100%.

A tone assignment method can be achieved by a method of adding or deleting a thin film on a reflecting part, a method of changing a size of a square reflecting part, and a method using partial reflection by means of a hatching pattern or the like. However, a tone may be assigned by another method as long as a reflecting light amount can be increased/decreased. In FIG. 1, a reflecting part corresponding to 25% (reflectance) is expressed by vertical-horizontal hatching, that corresponding to 50% is expressed by vertical (lines in the Y direction) hatching, that corresponding to 75% is expressed by horizontal (lines in the X direction) hatching, and that corresponding to 100% is expressed by white (no hatching). Combinations between the reflectances and codes in the X and Y directions can be changed. Each of the plurality of reflecting parts configures a mark including both information of the first quantized code used to indicate a position in the X direction (first direction) and information of the second quantized code used to indicate a position in the Y direction (second direction).

On the linear light-receiving element array PDA(X), light reflected by at least the first number of (11) square reflecting parts which are illuminated with a light beam selected by the opening SLT(X) and neighbor in the X direction of the two-dimensional scale SCL is projected as a periodic density pattern. Likewise, on the linear light-receiving element array PDA(Y), light reflected by at least the second number of (11) square reflecting parts which are illuminated with a light beam selected by the opening SLT(Y) and neighbor in the Y direction of the two-dimensional scale SCL is projected as a periodic density pattern. The linear light-receiving arrays PDA(X) and PDA(Y) are configured so that reflected light by one square reflecting part enters N=12 light-receiving elements (photoelectric conversion elements). Also, if an absolute code is M=11 bits, the linear light-receiving arrays PDA(X) and PDA(Y) are configured to receive periodic density patterns of M+1=12 periods. Therefore, in the example of FIG. 1, the number of effective elements of each of the linear light-receiving element arrays PDA(X) and PDA(Y) is $(M+1) \times N = 144$. The linear light-receiving element array PDA(X) configures a first detector which detects the first number of reflecting parts (marks) arranged in the X direction (first direction). The linear light-receiving element array PDA(Y) configures a second detector which detects the second number of reflecting parts (marks) arranged in the Y direction (second direction). Also, the linear light-receiving element arrays PDA(X) and PDA(Y) configure, as a whole, a detector which detects the first number of marks arranged in the first direction, and detects the second number of marks arranged in the second direction. The linear light-receiving element array PDA(X) configures a plurality of photoelectric conversion elements arranged in the first direction in the detector, and the linear light-receiving element array PDA(Y) configures a plurality of photoelectric conversion elements arranged in the second direction in the detector.

Signal processing using detection results of the linear light-receiving element arrays PDA(X) and PDA(Y) in processors PRO(X) and PRO(Y) will be described below with reference to FIGS. 2A and 2B. The light-receiving element array PDA(X) is laid out to be arrayed for detection in the X direction, and receives a light beam reflected by a rectangular region A on the scale SCL. The light-receiving element array PDA(X) is configured so that N light-receiving elements (photoelectric conversion elements) are laid out in correspondence with one reflecting part, and phases output from the respective light-receiving elements are shifted by equal intervals. That is, the light-receiving elements (photoelectric conversion elements) of the light-receiving element array PDA(X) are arranged at pitches smaller than periods in the X direction of the reflecting parts (marks) along the X direction. The number (first number) of bits of an absolute code is M=11, the number of density signal divisions of the light-receiving element array PDA(X) is N=12, and the number of channels of the light-receiving element array PDA(X) is $(M+1) \times N = 144$. As a result, 12 periods of periodic signals (first periodic signals) can always be obtained by the 144 channels of the light-receiving element array PDA(X).

Likewise, the light-receiving element array PDA(Y) is laid out to be arrayed for detection in the Y direction, and receives a light beam reflected by a rectangular region B on the scale SCL. The light-receiving element array PDA(Y) is configured so that N light-receiving elements (photoelectric conversion elements) are laid out in correspondence with one reflecting part, and phases output from the respective light-receiving elements are shifted by equal intervals. That is, the light-receiving elements (photoelectric conversion elements) of the light-receiving element array PDA(Y) are also arranged at pitches smaller than periods in the Y direction of the reflecting parts (marks) along the Y direction. The number (second number) of bits of an absolute code is M=11, the number of density signal divisions of the light-receiving element array PDA(Y) is N=12, and the number of channels of the light-receiving element array PDA(Y) is (M+1)×N=144. As a result, 12 periods of periodic signals (second periodic signals) can always be obtained by the 144 channels of the light-receiving element array PDA(Y).

Density distributions GRPH0(X) and GRPH0(Y) are obtained when light beams with which the scale SCL is illuminated are projected onto the light-receiving element arrays PDA(X) and PDA(Y) in the state shown in FIG. 1. The respective elements of the light-receiving element arrays PDA(X) and PDA(Y) output a plurality of electric signals according to density patterns. In this embodiment, the plurality of electric signals output from the respective light-receiving elements are temporarily stored in registers RGST0(X) and RGST0(Y), and are sequentially output to the processors PRO(X) and PRO(Y) in accordance with externally applied clock signals. Signal waveforms GRPH1(X) and GRPH1(Y) are generated when the clock signals are sequentially applied. These waveforms are equal to the light amount distributions GRPH0(X) and GRPH0(Y) input to the light-receiving element arrays PDA(X) and PDA(Y).

The waveforms GRPH1(X) and GRPH1(Y) in FIGS. 2A and 2B are described as those obtained by modulating the amplitudes of sine waveforms by absolute codes (cyclic codes). However, actual waveforms GRPH1(X) and GRPH1(Y) include triangular and trapezoidal waves due to variations of intervals between the scale SCL and light-receiving element arrays PDA(X) and PDA(Y), thus distorting the sine waves. These two output waveforms are "waveform data" corresponding to the number of channels (M+1)×N=144 of the light-receiving element arrays PDA(X) and PDA(Y). However, assume that in the subsequent signal processing by the processors PRO(X) and PRO(Y), these waveform data are converted into "waveform data" including M×N=132 elements in central regions each selected by two vertical dotted lines.

The processor PRO(X) determines an absolute position in the X direction (first direction) of the scale SCL based on the serial transfer waveform GRPH1(X) output from the light-receiving element array PDA(X). Likewise, the processor PRO(Y) determines an absolute position in the Y direction (second direction) of the scale SCL based on the serial transfer waveform GRPH1(Y) output from the light-receiving element array PDA(Y). The waveform data GRPH1(X) and GRPH1(Y) are branched into two routes by registers RGST1(X) and RGST1(Y). In the first route, calculation units AVE(X) and AVE(Y) calculate sums of central parts and five neighboring elements (values twice of averages of 11 elements) of the waveform data GRPH1(X) and GRPH1(Y), and store these values in registers RGST2(X) and RGST2(Y). The values stored in the registers RGST2(X) and RGST2(Y) are waveform data GRPH2(X) and GRPH2(Y). The calculation units AVE(X) and AVE(Y) also detect maximum values Max and minimum values Min at that time. Comparators COMP(X) and COMP(Y) binarize the waveform data GRPH2(X) and GRPH2(Y) for each period to generate digital signal waveforms GRPH3(X) and GRPH3(Y) indicating data sequences of 11 binary codes (first and second code sequences). The generated waveform data GRPH3(X) and GRPH3(Y) are stored in registers RGST3(X) and RGST3(Y). Note that a binarization criterion uses an average value of the aforementioned maximum value Max and minimum value Min, and in the X direction in FIG. 2A, a maximum value is 1 and a minimum value is 0.5. These waveform data GRPH3(X) and GRPH3(Y) are used as tentative integer parts of absolute codes. Reciprocals of the tentative integer parts of the absolute codes are calculated by calculation units GAIN(X) and GAIN(Y) to be converted into waveform data GRPH4(X) and GRPH4(Y), which are stored in registers RGST4(X) and RGST4(Y).

In the second route, the waveform data GRPH1(X) and GRPH1(Y) are multiplied by those in the registers RGST4(X) and RGST4(Y) by multiplier units MULT0(X) and MULT0(Y) to be converted into waveform data GRPH5(X) and GRPH5(Y). The converted waveform data GRPH5(X) and GRPH5(Y) are stored in registers RGST5(X) and RGST5(Y). These waveform data GRPH5(X) and GRPH5(Y) are periodic signals obtained by normalizing, to given amplitudes, amplitude-modulated components of the "waveform data" including M×N=132 elements in the central regions each selected by the two vertical dotted lines of the original waveform data GRPH1(X) and GRPH1(Y).

This periodic signal GRPH5(X) is distributed to four signals, which are then multiplied by $\{(1-\sin \omega t)/2\}$, $\{(1-\cos \omega t)/2\}$, $\{(1+\sin \omega t)/2\}$, and $\{(1+\cos \omega t)/2\}$ by multipliers MULT1(X) to MULT4(X). Also, the periodic signal GRPH5(Y) is distributed to four signals, which are then multiplied by $\{(1-\sin \omega t)/2\}$, $\{(1-\cos \omega t)/2\}$, $\{(1+\sin \omega t)/2\}$, and $\{(1+\cos \omega t)/2\}$ by multipliers MULT1(Y) to MULT4(Y). Sum total calculators SUM1(X) to SUM4(X) and SUM1(Y) to SUM4(Y) calculate sum totals of the multiplied periodic signals. Signals Ax(+), Bx(+), Ax(−), and Bx(−) and Ay(+), By(+), Ay(−), and By(−) obtained by the sum total calculations are stored in registers RGST6(X) and RGST6(Y). These four signals in each of the X and Y directions correspond to four-phase signals having 90° phase differences of a so-called incremental encoder.

Four waveform data stored in registers RGST(sin−), RGST(cos−), RGST(sin+), and RGST(cos+) are input to the multipliers MULT1(X) to MULT4(X) and MULT1(Y) to MULT4(Y). These four waveform data are waveform data GRPH(sin−), GRPH(cos−), GRPH(sin+), and GRPH(cos+) each including 11×12=132 elements. Each waveform data assumes a value corresponding to a correlation value between a pseudo-sine wave-shaped density pattern and an ideal sine wave-shaped pattern by the above multiplications and sum total calculations (product-sum calculations or integrations of products). Note that the calculations mathematically correspond to a definite integration, in a region of an integer multiple of a period, of a product of a periodic signal having harmonic/DC components and a sine (or cosine) function. Thus, by reducing the influences of harmonic and DC components, a phase sine (or cosine) function value (that is, a phase) can be obtained. Therefore, even when the original waveforms GRPH5(X) and GRPH5(Y) contain waveform distortions (harmonic and DC components), a correct phase value can be acquired. That is, the signals Ax(+), Bx(+), Ax(−), and Bx(−) and Ay(+), By(+), Ay(−), and By(−) correspond to four-phase signals of an incremental encoder with very small distortions. Note that the number of light-receiving elements on which a density pattern of one period is projected is N=12 in this embodiment. When the number of light-receiving element is further increased, distortions can be removed further ideally. However, in case of an optical encoder, since distortion components normally correspond to components of 2nd-, 3rd-, and 4th-orders, a sufficient effect can be obtained in practice by N=12. The values of the registers RGST6(X) and RGST6(Y) are input to arctangent calculators ATN(X) and ATN(Y). K-bit phase information PHS (X) calculated by an arctangent calculation is position data (third position data) in the X direction, which is calculated at a resolution shorter than the length of a mark period, and is stored in a register RGST7(X). Also, K-bit phase information PHS(Y) calculated by an arctangent calculation is position data (fourth position data) in the Y direction, which is calculated at a resolution shorter than the length of a mark period, and is stored in a register RGST7(Y). Assuming that K=10, the number of divisions is 2^10=1024, and a value ranging from 0 to 1023 as an interpolation unit of an absolute code, a phase of which corresponds to 0° to 360°, is stored as a binary value.

The tentative integer part of an absolute code includes M×N=132 elements, and an integer part of the absolute code can be determined by extracting 12 elements from those elements. The processors PRO(X) and PRO(Y) convert the integer parts of the absolute codes into position data (first and second position data) in the X and Y directions, which have a mark period as a unit. Elements to be extracted have to be shifted according to a value of an interpolation unit of an absolute code. For example, when an interpolation phase in the X direction is 0° (an interpolation unit of an absolute code is 0000000000), every 12 data of the register RGST3(X) can be extracted to have an end as an origin. When an interpolation phase in the X direction is 180° (an interpolation unit of an absolute code is 0111111111), every 12 data of the register RGST3(X) can be extracted to have the 6th position from the end as an origin. A code switching part becomes ambiguous, and an error tends to occur. However, with this method, since data near the center of a region where no code switching occurs are extracted, it is very rare to generate errors upon acquisition of a code.

The acquired integer part of the absolute code is a cyclic code and is often difficult to be handled. In this case, the integer part can be converted into a normal binary code. The finally obtained integer parts and interpolation units of the absolute codes are combined and stored in registers RGST(X) and RGST(Y). These pieces of information stored in the registers are externally output as absolute encoder signals indicating absolute positions of the scale SCL in response to a request. The absolute encoder signals in the X and Y directions may be either separated codes or coupled codes.

Figure 3:
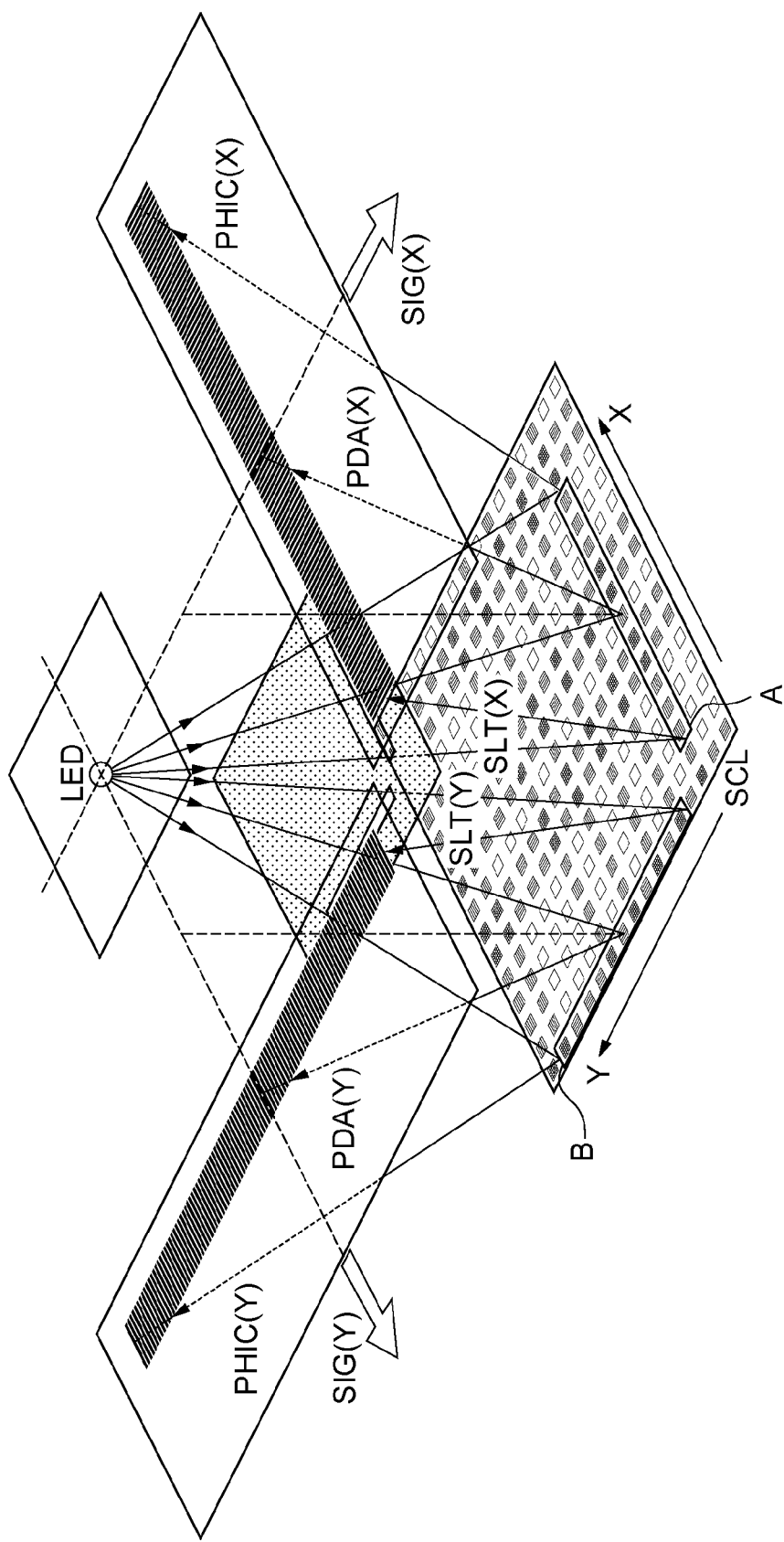
FIG. 3 is an explanatory view of the optical system when an illumination position to a scale is shifted in the first embodiment.
Figure 4A:
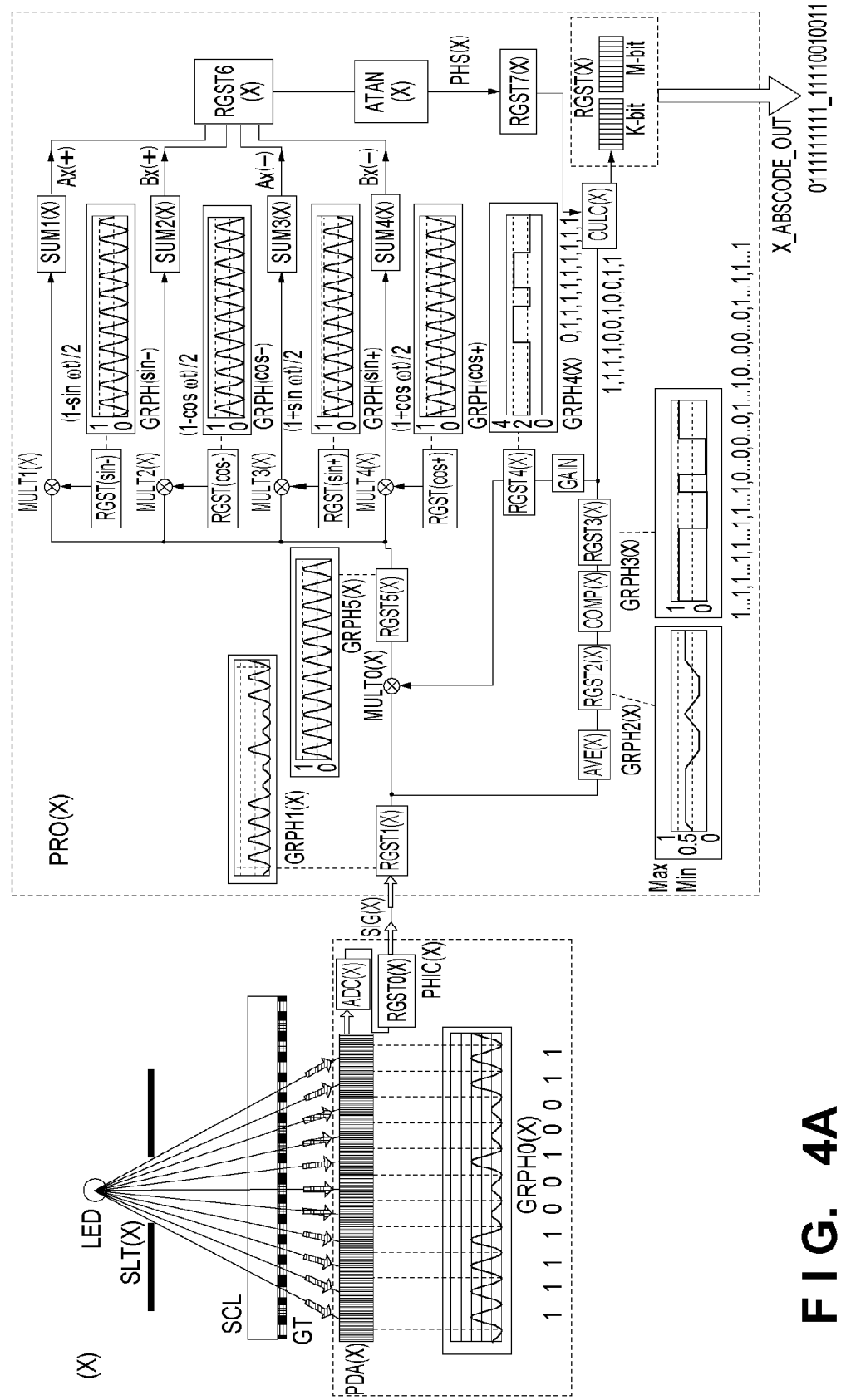
FIG. 4A is an explanatory diagram of the processor when an illumination position to a scale is shifted in the first embodiment.
Figure 4B:
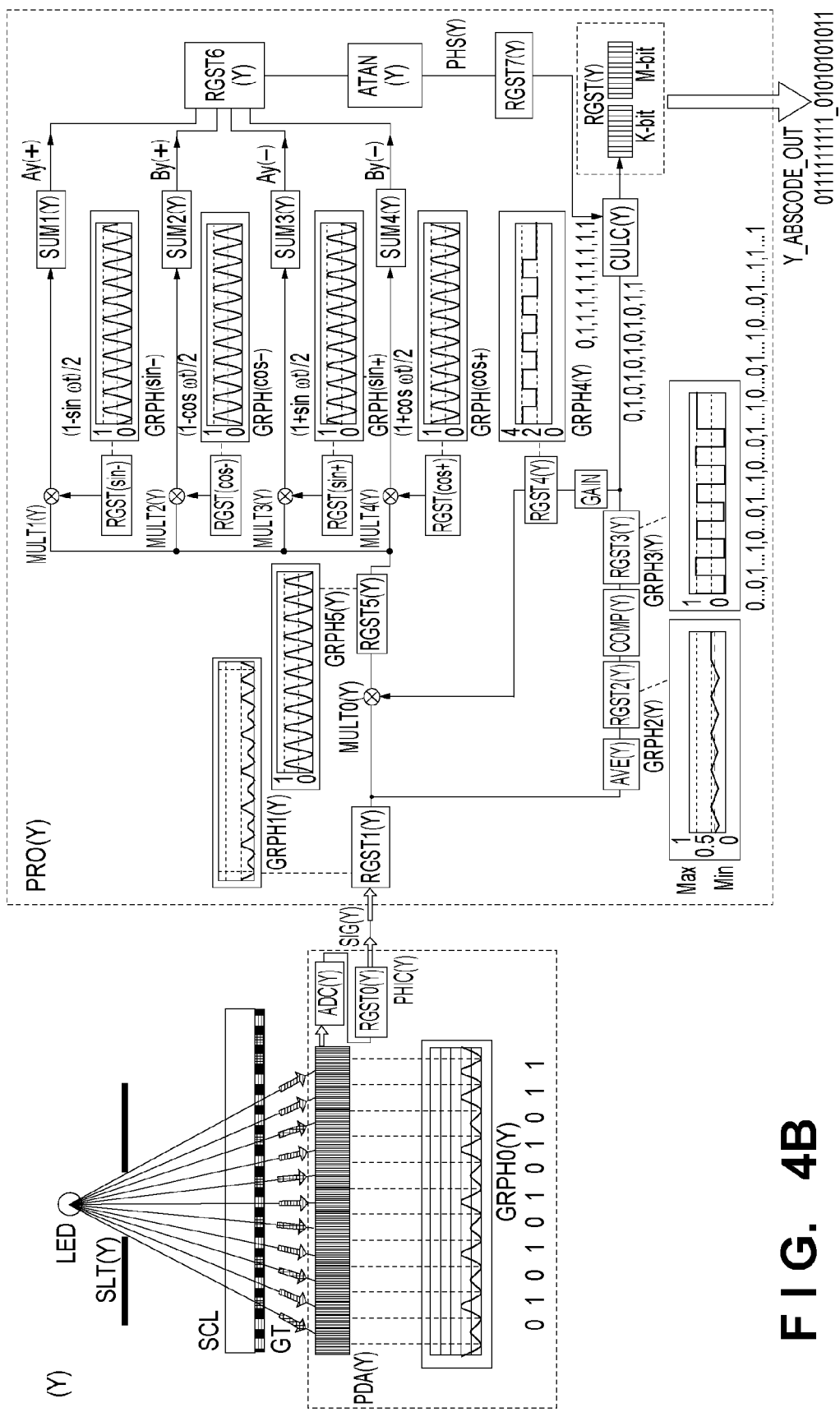
FIG. 4B is an explanatory diagram of the other processor when an illumination position to a scale is shifted in the first embodiment.

In the above description, the portions A and B illuminated with the light beams of the scale SCL in the optical system shown in FIG. 1 match grid-like patterns for the sake of easy understanding. However, for example, the illuminated positions may often be shifted to next neighboring patterns, as shown in FIG. 3. Density distributions GRPH0(X) and GRPH0(X) in FIGS. 4A and 4B are obtained when the light beams with which the scale SCL is illuminated in the state shown in FIG. 3 are projected onto the light-receiving element arrays PDA(X) and PDA(Y). As in the description of FIGS. 2A and 2B, data from the registers RGST1(X) and RGST1(Y) are branched into two routes. In the first route, the calculation units AVE(X) and AVE(Y) calculate sums of central parts and five neighboring elements (values twice of averages of 11 elements) of the waveform data GRPH1(X) and GRPH1(Y), and store these values in registers RGST2 (X) and RGST2(Y). The stored values are waveform data GRPH2(X) and GRPH2(Y). The calculation units AVE(X) and AVE(Y) also detect maximum values Max and minimum values Min at that time. Furthermore, the comparators COMP (X) and COMP(Y) binarize waveform data GRPH2(X) and GRPH2(Y) to convert them into waveform data GRPH3(X) and GRPH3(Y), and store these data in the registers RGST3 (X) and RGST3(Y). Note that a binarization criterion uses an average value of the aforementioned maximum value Max and minimum value Min, and in the X direction in FIG. 4A, a maximum value is 0.75 and a minimum value is 0.5. Note that these waveform data GRPH3(X) and GRPH3(Y) are used as tentative integer parts of absolute codes. The calculation units GAIN(X) and GAIN(Y) calculate reciprocals of the waveform data GRPH3(X) and GRPH3(Y) to convert them into waveform data GRPH4(X) and GRPH4(Y), and store these waveform data in the registers RGST4(X) and RGST4(Y). Using the waveform data GRPH4(X) and GRPH4(Y), periodic signals GRPH5(X) and GRPH5(Y) are obtained by normalizing, to given amplitudes, amplitude-modulated components including M×N=132 elements in the central regions each selected by the two vertical dotted lines of the original waveform data GRPH1(X) and GRPH1(Y). The subsequent signal processing is the same as that in FIGS. 2A and 2B, and a description thereof will not be repeated. As described above, even in case of the scale positions in FIG. 3, the signal processing functions normally.

Second Embodiment

Figure 5:
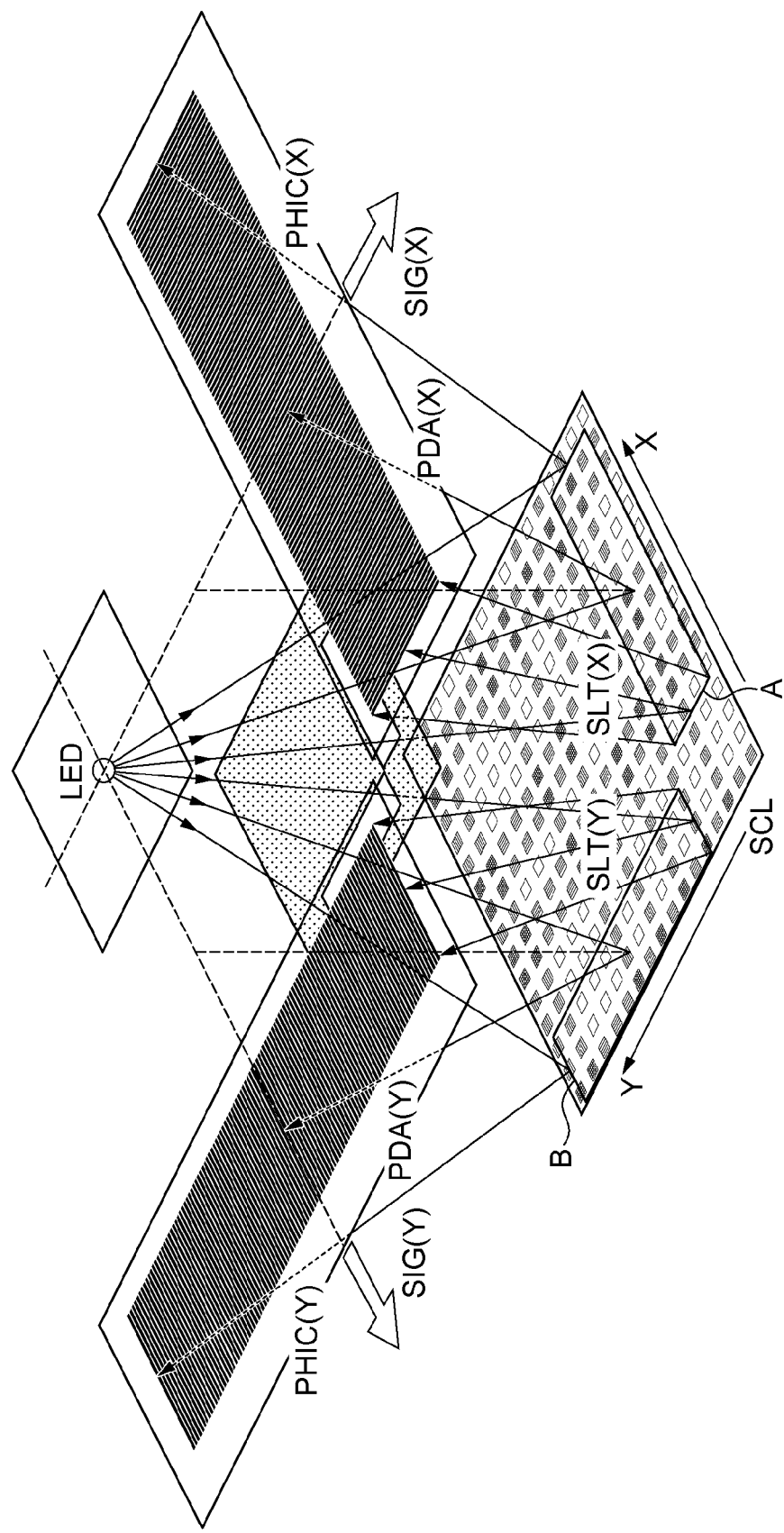
FIG. 5 is a view showing the configuration of an optical system of a two-dimensional absolute encoder according to the second embodiment.
Figure 6A:
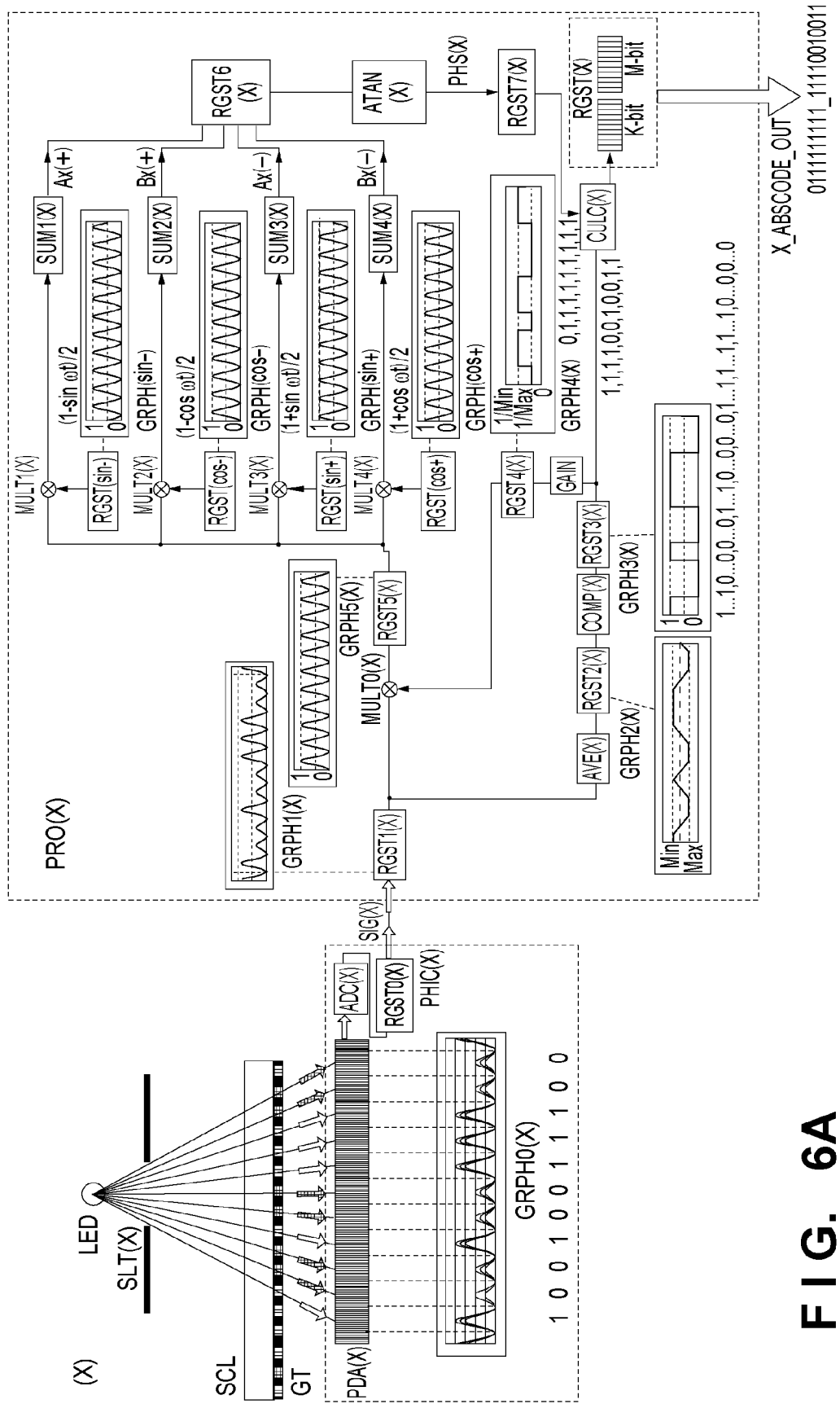
FIG. 6A is an explanatory diagram showing the arrangement of a processor of the two-dimensional absolute encoder according to the second embodiment.

A two-dimensional absolute encoder according to the second embodiment will be described below with reference to FIG. 5 and FIGS. 6A and 6B. In the description of the first embodiment, the portions A and B illuminated with the light beams of the scale SCL, as shown in FIG. 1 or 3, match grid-like patterns. However, in practice, illuminated portions on the scale SCL may be intermediate positions between neighboring patterns, and waveform data of amplitude-modulated periodic signals often fail to be obtained. Hence, in the second embodiment, as shown in FIG. 5, light beams are projected using an opening SLT(X) having a width equal to or larger than a pitch, so as to detect, along the Y direction, a plurality of columns of marks arranged in the X direction, and are received and averaged using a light-receiving element array PHIC(X) by a region of one period or more in the Y direction. Likewise, light beams are projected using an opening SLT(Y) having a width equal to or larger than a pitch, so as to detect, along the X direction, a plurality of columns of marks arranged in the Y direction, and are received and averaged using a light-receiving element array PHIC(Y) by a region of one period or more in the X direction. FIGS. 6A and 6B show processors PRO(X) and PRO(Y) corresponding to the optical system of this embodiment. FIG. 6A shows a received-light amount distribution GRPH0(X) of the light-receiving element array PHIC(X). In the distribution GRPH0 (X), three sine curves are shown. This means that the received-light amount distribution of the light-receiving element array PHIC(X) changes in this range due to position variations of the scale SCL in the Y direction. Also, three sine curves are shown in a received-light amount distribution GRPH0(Y) of a light-receiving element array PHIC(Y) shown in FIG. 6B. This means that the received-light amount distribution of the light-receiving element array PHIC(Y) changes in this range due to position variations of the scale SCL in the X direction.

In this manner, a peak value of a periodic signal obtained by the light-receiving element array PHIC(X) varies depending on a relative position of the scale SCL in the Y direction. However, the processor PRO(X) calculates an average value of three signals, and can attain correct demodulation by binarization using an intermediate value between their maximum and minimum values. Likewise, a peak value of a periodic signal obtained by the light-receiving element array PHIC(Y)

varies depending on a relative position of the scale SCL in the X direction. However, the processor PRO(Y) calculates an average value of three signals, and can attain correct demodulation by binarization using an intermediate value between their maximum and minimum values. Since this embodiment has a higher use efficiency of light beams than the first embodiment, detection with less noise can be attained, and a resolution and response performance can be more improved.

The two-dimensional absolute encoder with the above arrangement averages and calculates N sets of periodic signals by N marks each at arbitrary positions on the two-dimensional scale SCL using detection heads for the X and Y directions. For this reason, pieces of phase information (interpolation units of absolute codes) interpolated by the arctangent calculations can have precision as high as a conventional incremental encoder. Since switching parts of absolute codes use pieces of phase information calculated by averaging N sets of periodic signals, they are specified without being influenced by drawing errors of mark edges. For this reason, the precision of the integer parts of the absolute codes is very high. Hence, a high-resolution two-dimensional absolute encoder, which can maintain high precision of the absolute codes to be finally output although slight attachment errors are included, can be implemented.

Other Embodiments

The present invention is not limited to the arrangements of the first and second embodiments, and allows various modifications and changes within the scope of the invention. Examples of aspects which allow modifications and changes will be described below.

1. In the first and second embodiments, the two-dimensional scale is illuminated with diverging light from the common light-emitting element, and reflected light by the marks arranged on the two-dimensional scale is projected onto the linear light-receiving element arrays for detections in the X and Y directions. However, independent light sources for the X and Y directions may be prepared, and may be laid out at spatially different positions. In the first and second embodiments, the scale is illuminated with diverging light, and reflected light is magnified and projected onto the light-receiving element arrays. However, an arrangement which converts light coming from the light source into parallel light using, for example, a collimator lens, and illuminates the scale with that light to receive its reflected light, an arrangement which forms an image of a mark pattern on the scale on each light-receiving element array using an imaging lens, and an arrangement which attains detection using other optical systems may be adopted. In the first and second embodiments, as shown in FIGS. 1, 3, and 5, a plate member having openings A and B is arranged between the light source and scale. However, no problem is posed if the plate member having the openings A and B is removed since a region entering a light-receiving element is specified by a size and shape of the light-receiving element.

2. The first and second embodiments use the scale of the reflecting type, which corresponds to codes (0, 1) in the two directions by laying out square reflecting patterns at equal intervals, and assigning four tones to reflectances. However, a scale of the transmission type, which uses a plurality of marks having the same shape but different transmittances, and a detector that detects light transmitted through the marks may be adopted. The tones of the reflectances (or transmittances) of the marks are not limited to four types, that is, 100%, 75%, 50%, and 25%, and may use other tone values, or five or more tones may be used.

3. In the first and second embodiments, the light-receiving element arrays PDA(X) and PDA(Y) are configured to detect one density period by the 12 light-receiving elements. However, number of light-receiving elements which detect one density period may be changed to 3, 4, 6, 8, and so forth.

4. The light-receiving element arrays PDA(X) and PDA(Y) may simultaneously receive light from regions of the number N of bits or more of absolute codes, and the processors may internally calculate only required regions. In this case, a so-called "averaging effect of grids of an incremental encoder" of periodic signals is enhanced, and interpolation units can have still higher precision. Also, an effect of reducing the influences of partial read errors by appropriate signal processing (although redundancy increases) can be expected.

5. As the light-receiving element array, even when a two-dimensional light-receiving element array such as a CCD may be used in place of the two linear light-receiving element arrays, the processors can internally extract information of required regions, and can apply similar signal processing. In this case, a light-projecting optical system and light-receiving optical system are integrated, thus often contributing to a size reduction. However, a read speed of signals from the two-dimensional light-receiving element array has to be cared.

6. Equations and values used in calculations in this embodiment may be changed as needed in consideration of sensitivity variations of respective cells of the light-receiving element arrays and light amount nonuniformity caused by an optical system. Also, approximate values may be applied according to the required precision.

7. The processors may implement equivalent functions using other algorithms or sequences. A method of applying addition/subtraction/multiplication processing to signals from the light-receiving element arrays using parallel analog circuits, a method of applying addition/subtraction/multiplication processing or filtering processing to signals using serial analog circuits, and a method of immediately A/D-converting signals from the light-receiving element arrays, and applying calculation processing to digital information by, for example, an FPGA are available. In the first and second embodiments, an encoder optical system which directly transmits parallel light through it is used. However, an arrangement which illuminates the scale with diverging light and receives its magnified transmitting light or magnified reflected light by the light-receiving element arrays, and a detection method using an optical system using a method of forming a grid pattern on the scale on the light-receiving element arrays using an imaging lens or other optical systems are available.

8. In the first and second embodiments, cyclic codes are used as the absolute codes. Alternatively, other codes may be used.

9. In the first and second embodiments, square reflecting patterns which are laid out at equal intervals are used as the absolute codes. However, rectangular reflecting patterns may be used. In this case, different resolutions are set in the X and Y directions. Also, circular, elliptic, and other patterns may be used in place of square or rectangular patterns. Also, in place of shape patterns having clear boundaries, a periodic tone pattern on which reflectances (or transmittances) vary continuously may be used. That is, any other patterns can be used as long as intensity-modulated periodic patterns are projected on the light-receiving element arrays.

With the absolute codes of the present invention, the following effects can be obtained.

Since the integer part and interpolation unit of the absolute code are calculated based on the single light-receiving element array, a high resolution and high precision can be assured. Even when a light amount distribution (pattern) projected onto each light-receiving element array varies, a stable operation can always be obtained. That is, a high resolution, high precision, and easiness of handling equivalent to those of an incremental encoder can be obtained.

As the light-receiving element array, two linear light-receiving element arrays can be used in addition to a two-dimensional light-receiving element array such as a CCD or CMOS, thus obtaining high-speed responses.

Patterns on the scale are simple reflectance or transmittance tone patterns, and the absolute code patterns can be easily designed and manufactured with low cost.

The configuration of the generation unit and interpolation unit of the absolute code can be implemented by a small-scale electronic circuit, and no complicated signal processing is required. Hence, the compact absolute code generation unit and interpolation unit can be configured with low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-141215 filed Jun. 24, 2011, which is hereby incorporated by reference herein in its entirety.

What is claimed is:

1. A two-dimensional absolute encoder comprising:
a scale on which a plurality of marks are two-dimensionally arranged with a predetermined space therebetween at a predetermined pitch along a first direction and a second direction;
a detector configured to detect a first number of marks arranged in the first direction, and to detect a second number of marks arranged in the second direction; and
a processor configured to respectively obtain absolute positions of the scale in the first direction and the second direction based on outputs from the detector,
wherein each of the plurality of marks has one of characteristics corresponding to pairs of information of a first quantized code for indicating a position of the scale in the first direction and information of a second quantized code for indicating a position of the scale in the second direction, and
the processor is configured to generate a first code sequence including the first number of the first quantized code based on detection of the first number of marks and information of the pairs corresponding to the characteristics, to obtain an absolute position of the scale in the first direction based on the first code sequence, to generate a second code sequence including the second number of the second quantized code based on detection of the second number of marks and the information of the pairs corresponding to the characteristics, and to obtain an absolute position of the scale in the second direction based on the second code sequence.

2. The encoder according to claim 1, wherein the plurality of marks include a plurality of types of marks which have the same shape and have transmittances different from each other, where a number of the types is a number given by multiplying a number of types of the first quantized code by a number of types of the second quantized code, and the detector is configured to detect light transmitted through the plurality of marks.

3. The encoder according to claim 1, wherein the plurality of marks include a plurality of types of marks which have the same shape and have reflectances different from each other, where a number of the types is a number given by multiplying a number of types of the first quantized code by a number of types of the second quantized code, and the detector is configured to detect light reflected by the plurality of marks.

4. The encoder according to claim 1, wherein the detector is configured to detect, in the second direction over a width not less than the predetermined pitch, the first number of marks arranged in the first direction, and to detect, in the first direction over a width not less than the predetermined pitch, the second number of marks arranged in the second direction.

5. The encoder according to claim 1, wherein the detector includes a plurality of photoelectric conversion elements arranged in the first direction and the second direction at a pitch smaller than the predetermined pitch,
the processor is configured to generate the first code sequence by quantizing the first number of periodic signals output from the detector, to obtain first position data in the first direction based on the first code sequence, to generate the second code sequence by quantizing the second number of periodic signals output from the detector, and to obtain second position data in the second direction based on the second code sequence,
the processor is configured to obtain third position data in the first direction based on a phase of at least one of the first number of periodic signals, and to obtain fourth position data in the second direction based on a phase of at least one of the second number of periodic signals, and
the processor is configured to generate data indicating the absolute position of the scale in the first direction based on the first position data and the third position data, and to generate data indicating the absolute position of the scale in the second direction based on the second position data and the fourth position data.

6. The encoder according to claim 1, wherein the detector includes a first detector configured to detect the first number of marks arranged in the first direction, and a second detector configured to detect the second number of marks arranged in the second direction.

7. A scale for a two-dimensional absolute encoder, on which a plurality of marks are two-dimensionally arranged with a predetermined space therebetween at a predetermined pitch along a first direction and a second direction, wherein
each of the plurality of marks has one of characteristics corresponding to pairs of information of a first quantized code for indicating a position of the scale in the first direction, and information of a second quantized code for indicating a position of the scale in the second direction, and
wherein the plurality of marks include a plurality of types of marks which have the same shape and have transmittances different from each other, and number of the types is number given by multiplying number of types of the first quantized code by number of types of the second quantized code.

8. A scale for a two-dimensional absolute encoder, on which a plurality of marks are two-dimensionally arranged with a predetermined space therebetween at a predetermined pitch along a first direction and a second direction, wherein
each of the plurality of marks has one of characteristics corresponding to pairs of information of a first quantized code for indicating a position of the scale in the first direction, and information of a second quantized code for indicating a position of the scale in the second direction, and
wherein the plurality of marks include a plurality of types of marks which have the same shape and have reflectances different from each other, and number of the types is number given by multiplying number of types of the first quantized code by number of types of the second quantized code.

9. A two-dimensional absolute encoding method of obtaining absolute positions in a first direction and a second direction of a scale, wherein, on the scale, a plurality of marks are two-dimensionally arranged with a predetermined space therebetween at a predetermined pitch along the first direction and the second direction, the method comprising steps of:
　detecting a first number of marks arranged in the first direction, and a second number of marks arranged in the second direction; and
　obtaining absolute positions of the scale in the first direction and the second direction based on the detected first number of marks and the detected second number of marks, respectively,
　wherein
　each of the plurality of marks has one of a plurality of characteristics corresponding to pairs of information of a first quantized code and information of a second quantized code, wherein the first quantized code is one of a plurality of first quantized codes which are defined on the scale along the first direction, each first quantized code sequence included in the plurality of first quantized codes indicates a first coordinate of the scale in the first direction, the second quantized code is one of a plurality of second quantized codes which are defined on the scale along the second direction, and each second quantized code sequence included in the plurality of second quantized codes indicates a second coordinate of the scale in the second direction, and
　the first quantized code sequence is generated based on detection of the first number of marks and information of the pairs corresponding to the characteristics, the absolute position of the scale in the first direction is obtained based on the first quantized code sequence, the second quantized code sequence is generated based on detection of the second number of marks and the information of the pairs corresponding to the characteristics, and the absolute position of the scale in the second direction is obtained based on the second quantized code sequence.

10. A scale for use in a two-dimensional absolute encoding method, the method obtaining absolute positions in a first direction and a second direction of a scale, wherein, on the scale, a plurality of marks are two-dimensionally arranged with a predetermined space therebetween at a predetermined pitch along the first direction and the second direction, the method comprising steps of:
　detecting a first number of marks arranged in the first direction, and a second number of marks arranged in the second direction; and
　obtaining absolute positions of the scale in the first direction and the second direction based on the detected first number of marks and the detected second number of marks, respectively,
　wherein
　each of the plurality of marks has one of a plurality of characteristics corresponding to pairs of information of a first quantized code and information of a second quantized code, wherein the first quantized code is one of a plurality of first quantized codes which are defined on the scale along the first direction, each first quantized code sequence included in the plurality of first quantized codes indicates a first coordinate of the scale in the first direction, the second quantized code is one of a plurality of second quantized codes which are defined on the scale along the second direction, and each second quantized code sequence included in the plurality of second quantized codes indicates a second coordinate of the scale in the second direction, and the first quantized code sequence is generated based on detection of the first number of marks and information of the pairs corresponding to the characteristics, the absolute position of the scale in the first direction is obtained based on the first quantized code sequence, the second quantized code sequence is generated based on detection of the second number of marks and the information of the pairs corresponding to the characteristics, and the absolute position of the scale in the second direction is obtained based on the second quantized code sequence.

11. The scale according to claim 10, wherein the plurality of marks include a plurality of types of marks which have the same shape and have transmittances different from each other, and a number of the types is a number given by multiplying a number of types of the first quantized code by a number of types of the second quantized code.

12. The scale according to claim 10, wherein the plurality of marks include a plurality of types of marks which have the same shape and have reflectances different from each other, and a number of the types is a number given by multiplying a number of types of the first quantized code by a number of types of the second quantized code.

13. A two-dimensional absolute encoder comprising a scale for use in a two-dimensional absolute encoding method, and configured to execute steps in the two-dimensional absolute encoding method, the method obtaining absolute positions in a first direction and a second direction of the scale, wherein, on the scale, a plurality of marks are two-dimensionally arranged with a predetermined space therebetween at a predetermined pitch along the first direction and the second direction, the method comprising steps of:
　detecting a first number of marks arranged in the first direction, and a second number of marks arranged in the second direction; and
　obtaining absolute positions of the scale in the first direction and the second direction based on the detected first number of marks and the detected second number of marks, respectively, wherein
　each of the plurality of marks has one of a plurality of characteristics corresponding to pairs of information of a first quantized code and information of a second quantized code, wherein the first quantized code is one of a plurality of first quantized codes which are defined on the scale along the first direction, each first quantized code sequence included in the plurality of first quantized codes indicates a first coordinate of the scale in the first direction, the second quantized code is one of a plurality of second quantized codes which are defined on the scale along the second direction, and each second quantized code sequence included in the plurality of second quantized codes indicates a second coordinate of the scale in the second direction, and
　the first quantized code sequence is generated based on detection of the first number of marks and information of the pairs corresponding to the characteristics, the absolute position of the scale in the first direction is obtained based on the first quantized code sequence, the second quantized code sequence is generated based on detection of the second number of marks and the information of the pairs corresponding to the characteristics, and the absolute position of the scale in the second direction is obtained based on the second quantized code sequence.

14. The encoder according to claim 13, comprising:
a detector configured to detect the first number of marks arranged in the first direction, and to detect the second number of marks arranged in the second direction; and
a processor configured to respectively obtain the absolute positions of the scale in the first direction and the second direction based on outputs from the detector.

15. The encoder according to claim 14, wherein the detector is configured to detect light transmitted through the scale.

16. The encoder according to claim 14, wherein the detector is configured to detect light reflected by the scale.

17. The encoder according to claim 14, wherein the detector is configured to detect, in the second direction over a width not less than the predetermined pitch, the first number of marks arranged in the first direction, and to detect, in the first direction over a width not less than the predetermined pitch, the second number of marks arranged in the second direction.

18. The encoder according to claim 14, wherein the detector includes a plurality of photoelectric conversion elements arranged in the first direction and the second direction at a pitch smaller than the predetermined pitch,
the processor is configured to generate the first quantized code sequence by quantizing the first number of periodic signals output from the detector, to obtain first position data in the first direction based on the first quantized code sequence, to generate the second quantized code sequence by quantizing the second number of periodic signals output from the detector, and to obtain second position data in the second direction based on the second quantized code sequence,
the processor is configured to obtain third position data in the first direction based on a phase of at least one of the first number of periodic signals, and to obtain fourth position data in the second direction based on a phase of at least one of the second number of periodic signals, and
the processor is configured to generate data indicating the absolute position of the scale in the first direction based on the first position data and the third position data, and to generate data indicating the absolute position of the scale in the second direction based on the second position data and the fourth position data.

19. The encoder according to claim 14, wherein the detector includes a first detector configured to detect the first number of marks arranged in the first direction, and a second detector configured to detect the second number of marks arranged in the second direction.

20. A two-dimensional absolute encoder comprising:
a scale on which a plurality of marks are two-dimensionally arranged with a predetermined space therebetween at a predetermined pitch along a first direction and a second direction;
a detector configured to detect a first number of marks arranged in the first direction, and to detect a second number of marks arranged in the second direction; and
a processor configured to respectively obtain absolute positions of the scale in the first direction and the second direction based on outputs from the detector,
wherein each of the plurality of marks has one of characteristics corresponding to pairs of information of a first quantized code for indicating a position of the scale in the first direction and information of a second quantized code for indicating a position of the scale in the second direction, and
the processor is configured to generate a first code sequence including the first number of the first quantized code based on detection of the first number of marks and information of the characteristics, to obtain an absolute position of the scale in the first direction based on the first code sequence, to generate a second code sequence including the second number of the second quantized code based on detection of the second number of marks and the information of the characteristics, and to obtain an absolute position of the scale in the second direction based on the second code sequence.

21. A scale for a two-dimensional absolute encoder, on which a plurality of marks are two-dimensionally arranged with a predetermined space therebetween at a predetermined pitch along a first direction and a second direction, wherein
each of the plurality of marks has one of characteristics corresponding to pairs of information of a first quantized code for indicating a position of the scale in the first direction, and information of a second quantized code for indicating a position of the scale in the second direction,
a number of the characteristics being consistent with a number of types of the first quantized code and a number of types of the second quantized code.

22. A two-dimensional absolute encoding method of obtaining absolute positions in a first direction and a second direction of a scale, wherein, on the scale, a plurality of marks are two-dimensionally arranged with a predetermined space therebetween at a predetermined pitch along the first direction and the second direction, the method comprising steps of:
detecting a first number of marks arranged in the first direction and a second number of marks arranged in the second direction; and
obtaining absolute positions of the scale in the first direction and the second direction based on the detected first number of marks and the detected second number of marks, respectively,
wherein
each of the plurality of marks has one of a plurality of characteristics corresponding to pairs of information of a first quantized code and information of a second quantized code, wherein the first quantized code is one of a plurality of first quantized codes which are defined on the scale along the first direction, each first quantized code sequence included in the plurality of first quantized codes indicates a first coordinate of the scale in the first direction, the second quantized code is one of a plurality of second quantized codes which are defined on the scale along the second direction, and each second quantized code sequence included in the plurality of second quantized codes indicates a second coordinate of the scale in the second direction, and
the first quantized code sequence is generated based on detection of the first number of marks and information of the characteristics, the absolute position of the scale in the first direction is obtained based on the first quantized code sequence, the second quantized code sequence is generated based on detection of the second number of marks and the information of the characteristics, and the absolute position of the scale in the second direction is obtained based on the second quantized code sequence.

23. A scale for use in a two-dimensional absolute encoding method, the method obtaining absolute positions in a first direction and a second direction of a scale, wherein, on the scale, a plurality of marks are two-dimensionally arranged with a predetermined space therebetween at a predetermined pitch along the first direction and the second direction, the method comprising steps of:
detecting a first number of marks arranged in the first direction and a second number of marks arranged in the second direction; and obtaining absolute positions of the scale in the first direction and the second direction based on the detected first number of marks and the detected second number of marks, respectively, wherein each of the plurality of marks has one of a plurality of characteristics corresponding to pairs of information of a first quantized code and information of a second quantized code, wherein the first quantized code is one of a plurality of first quantized codes which are defined on the scale along the first direction, each first quantized code sequence included in the plurality of first quantized codes indicates a first coordinate of the scale in the first direction, the second quantized code is one of a plurality of second quantized codes which are defined on the scale along the second direction, and each second quantized code sequence included in the plurality of second quantized codes indicates a second coordinate of the scale in the second direction, and the first quantized code sequence is generated based on detection of the first number of marks and information of the characteristics, the absolute position of the scale in the first direction is obtained based on the first quantized code sequence, the second quantized code sequence is generated based on detection of the second number of marks and the information of the characteristics, and the absolute position of the scale in the second direction is obtained based on the second quantized code sequence.

24. A two-dimensional absolute encoder comprising a scale for use in a two-dimensional absolute encoding method, and configured to execute steps in the two-dimensional absolute encoding method, the method obtaining absolute positions in a first direction and a second direction of the scale, wherein, on the scale, a plurality of marks are two-dimensionally arranged with a predetermined space therebetween at a predetermined pitch along the first direction and the second direction, the method comprising steps of:

detecting a first number of marks arranged in the first direction and a second number of marks arranged in the second direction; and obtaining absolute positions of the scale in the first direction and the second direction based on the detected first number of marks and the detected second number of marks, respectively, wherein each of the plurality of marks has one of a plurality of characteristics corresponding to pairs of information of a first quantized code and information of a second quantized code, wherein the first quantized code is one of a plurality of first quantized codes which are defined on the scale along the first direction, each first quantized code sequence included in the plurality of first quantized codes indicates a first coordinate of the scale in the first direction, the second quantized code is one of a plurality of second quantized codes which are defined on the scale along the second direction, and each second quantized code sequence included in the plurality of second quantized codes indicates a second coordinate of the scale in the second direction, and the first quantized code sequence is generated based on detection of the first number of marks and information of the characteristics, the absolute position of the scale in the first direction is obtained based on the first quantized code sequence, the second quantized code sequence is generated based on detection of the second number of marks and the information of the characteristics, and the absolute position of the scale in the second direction is obtained based on the second quantized code sequence.

* * * * *